US012432479B2

(12) United States Patent
Song et al.

(10) Patent No.: US 12,432,479 B2
(45) Date of Patent: Sep. 30, 2025

(54) EARPHONE AND MOBILE TERMINAL

(71) Applicant: HUAWEI TECHNOLOGIES CO., LTD., Guangdong (CN)

(72) Inventors: Xiangao Song, Shenzhen (CN); Rongrong Wu, Dongguan (CN); Chengxia Ji, Dongguan (CN); Yong Zheng, Dongguan (CN); Zhengxue Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 226 days.

(21) Appl. No.: 18/174,717

(22) Filed: Feb. 27, 2023

(65) Prior Publication Data

US 2023/0224620 A1 Jul. 13, 2023

Related U.S. Application Data

(63) Continuation of application No. PCT/CN2021/115741, filed on Aug. 31, 2021.

(30) Foreign Application Priority Data

Aug. 31, 2020 (CN) ......................... 202010900041.1
Aug. 26, 2021 (CN) ......................... 202110988228.6

(51) Int. Cl.
*H04R 1/10* (2006.01)
*H04R 1/08* (2006.01)

(52) U.S. Cl.
CPC ............ *H04R 1/1016* (2013.01); *H04R 1/08* (2013.01); *H04R 2201/02* (2013.01)

(58) Field of Classification Search
None
See application file for complete search history.

(56) References Cited

U.S. PATENT DOCUMENTS

2013/0114841 A1* 5/2013 Hwang .................... H04R 1/10 381/374
2013/0266150 A1 10/2013 Weil et al.
(Continued)

FOREIGN PATENT DOCUMENTS

CN 104429097 A 3/2015
CN 105589506 A 5/2016
(Continued)

OTHER PUBLICATIONS

Extended European Search Report dated Dec. 18, 2023, issued for European Application No. 21860579.8 (10 pages).
(Continued)

*Primary Examiner* — Kenny H Truong

(57) ABSTRACT

An earphone and a mobile terminal is provided, in which the earphone includes a housing and a speaker assembly. The housing internally includes a front cavity and a rear cavity that are separated by the speaker assembly. The front cavity is located on a side that is of the speaker assembly and that is a sound output direction, and the rear cavity is located on an opposite side of the sound output direction of the speaker assembly. One or more sound guide channels are disposed in the housing, each sound guide channel is disposed in a sidewall of the housing, and each sound guide channel is configured to: when the earphone is normally worn, connect air inside an ear canal of a user to air outside the ear canal without connecting air in the front cavity to air in the rear cavity.

20 Claims, 9 Drawing Sheets

(56) References Cited

U.S. PATENT DOCUMENTS

| | | | | |
|---|---|---|---|---|
| 2019/0045291 | A1* | 2/2019 | Kofman | A61B 5/0075 |
| 2019/0356991 | A1 | 11/2019 | Farver | |
| 2021/0166674 | A1* | 6/2021 | McCutcheon | G10K 11/17881 |

FOREIGN PATENT DOCUMENTS

| | | | |
|---|---|---|---|
| CN | 104396276 | B | 7/2016 |
| CN | 105959856 | A | 9/2016 |
| CN | 206422888 | U | 8/2017 |
| JP | 2018121285 | A | 8/2018 |
| WO | 2020249200 | A1 | 12/2020 |

OTHER PUBLICATIONS

International Search Report dated Nov. 25, 2021, issued for International Application No. PCT/CN2021/115741 (8 pages).

* cited by examiner

EARPHONE AND MOBILE TERMINAL

CROSS-REFERENCE TO RELATED APPLICATIONS

This application is a continuation of International Application No. PCT/CN2021/115741, filed on Aug. 31, 2021, which claims priority to Chinese Patent Application No. 202010900041.1, filed on Aug. 31, 2020 and Chinese Patent Application No. 202110988228.6, filed on Aug. 26, 2021. All of the aforementioned patent applications are hereby incorporated by reference in their entireties.

TECHNICAL FIELD

This disclosure relates to the field of communications technologies, and in particular, to an earphone and a mobile terminal.

BACKGROUND

Regardless of listening to MP3 players while traveling or listening to high-fidelity stereo systems at home, more consumers select in-ear and semi-in-ear earphones for their listening enjoyment. The two types of electro-acoustic transducer devices each have a relatively thin housing that includes a receiver or a driver (an earpiece speaker). The thin housing provides a user with both convenience and good sound quality. The semi-in-ear earphone is usually adapted to an external ear and slightly higher than an internal auditory meatus. The semi-in-ear earphone is usually not sealed in an ear canal. However, because sound may leak from the earphone and not reach the ear canal, sound quality may not be optimal for a user. In addition, due to different ear shapes and sizes, different amounts of sound may be leaked, resulting in inconsistent acoustic performance between users. This adversely affects the user experience.

SUMMARY

This disclosure provides an earphone and a mobile terminal, to improve acoustic performance of the earphone.

This disclosure provides an earphone, and the earphone is applied to a mobile terminal and is configured to be wirelessly connected to the mobile terminal. The earphone includes a housing and a speaker assembly. The housing internally includes a front cavity and a rear cavity that are separated by the speaker assembly. The front cavity is located on a side that is of the speaker assembly and that is a sound output direction, and the rear cavity is located on an opposite side of the sound output direction of the speaker assembly. One or more sound guide channels are disposed in the housing, each sound guide channel is disposed in a sidewall of the housing, and each sound guide channel is configured to: when the earphone is normally worn, connect air inside an ear canal of a user to air outside the ear canal without connecting air in the front cavity to air in the rear cavity. When the foregoing solutions are used, an environment inside the ear canal is connected to an environment outside the ear canal by using the sound guide channel disposed in the housing, so that sound pressure inside the ear canal can be exposed or exhausted to a surrounding environment outside the earphone. This reduces pressure inside the ear canal, thereby improvising sound experience of the user.

In a specific implementable solution, at least one of the one or more sound guide channels is a through hole disposed in the sidewall of the housing, the through hole has a first opening and a second opening, the first opening is connected to air inside the ear canal when the earphone is normally worn, and the second opening is connected to air outside the ear canal when the earphone is normally worn. The inside of the ear canal is directly connected to the outside of the ear canal by disposing the through hole in the sidewall of the housing.

In a specific implementable solution, an opening area S1 of the first opening and an opening area S2 of the second opening meet: a ratio of S1 to S2 is 0.5 to 2. This can ensure a good pressure leakage effect.

In a specific implementable solution, the opening area S1 of the first opening is equal to the opening area S2 of the second opening. This can ensure a good pressure leakage effect.

In a specific implementable solution, the opening area S1 of the first opening of the through hole is not less than 2 $mm^2$. This ensures a ventilation amount.

In a specific implementable solution, the first opening and the second opening may be oval, trapezoidal, round, or square. Different shapes of openings may be used.

In a specific implementable solution, at least one of the one or more sound guide channels is a groove disposed on an outer surface of the housing, an opening at one end of the groove is connected to air inside the ear canal when the earphone is normally worn, and an opening at the other end of the groove is connected to air outside the ear canal when the earphone is normally worn. The inside of the ear canal is connected to the outside of the ear canal by using the disposed groove.

In a specific implementable solution, at least one of the one or more sound guide channels includes a first channel group and a second channel group. The first channel group includes at least one first channel, and the first channel is a groove disposed on an outer surface of the housing. The second channel group includes at least one second channel, and the second channel is a through hole disposed in the sidewall of the housing. The first channel group is connected to the second channel group. One port of a combined channel including the first channel group and the second channel group is connected to air inside the ear canal when the earphone is normally worn, and the other port of the combined channel is connected to air outside the ear canal when the earphone is normally worn. Connection between the inside of the ear canal and the outside of the ear canal is implemented by using the structure of the combined channel.

In a specific implementable solution, the sound guide channel may be a linear, curved, serpentine, or branch-shaped channel. Different sound guide channels may be used.

In a specific implementable solution, at least one of the one or more sound guide channels is a conduit disposed in the sidewall of the housing, the conduit has a first opening and a second opening, the first opening is connected to air inside the ear canal when the earphone is normally worn, and the second opening is connected to air outside the ear canal when the earphone is normally worn. Connection between air inside the ear canal and air outside the ear canal is implemented by using the conduit.

In a specific implementable solution, a length of the sound guide channel is not less than 3 mm. This ensures that two ends of the sound guide channel are able to be not shielded by the ear canal.

In a specific implementable solution, the housing includes a tip region configured to be inserted into the ear canal of the user and a main body region extending outward from the tip region. The main body region and the tip region are respectively arranged on two sides of a clamping region. A length direction of the sound guide channel is a direction pointing to the tip region along the main body region. The clamping region is a region that is of the earphone and that is clamped in an ear. The foregoing disposition manner facilitates reduction of a pressure difference between the inside and the outside of the ear canal.

In a specific implementable solution, the sound guide channel may be partially parallel to an ear canal direction of the user. This facilitates reduction of a pressure difference between the inside and the outside of the ear canal.

In a specific implementable solution, the earphone further includes a microphone disposed in the front cavity and a sound pickup channel connected to the microphone. When the earphone is normally worn, air inside the ear canal of the user is connected to the microphone without connection to air in the front cavity. This can effectively improve stability of an FR response at an SP of a semi-in-ear earphone, and also can effectively improve correlation between FR responses at the SP and a DRP.

In a specific implementable solution, the microphone is disposed on an inner surface of the housing.

In a specific implementable solution, one end of the sound pickup channel is connected to the microphone, the other end of the sound pickup channel includes a sound pickup hole, and the sound pickup hole is disposed on a surface that is of the housing and that faces the ear canal. This facilitates disposition of the microphone.

In a specific implementable solution, the sound pickup hole is disposed in the sound guide channel.

In a specific implementable solution, the sound pickup channel includes a closed sound pickup pipe. One end of the sound pickup pipe is connected to the microphone, and the other end of the sound pickup pipe includes a sound pickup hole. When the earphone is normally worn, the sound pickup hole is connected to air inside the ear canal of the user without connection to air in the front cavity.

In a specific implementable solution, the housing includes an elastic sleeve, and a part of at least one of the one or more sound guide channels is disposed in the elastic sleeve.

In a specific implementable solution, the earphone further includes a processor, and the processor is configured to perform sound compensation based on a sound pickup effect of the microphone. This can effectively improve a sound effect of a semi-in-ear earphone.

According to a second aspect, a mobile terminal is provided. The mobile terminal includes a body and the earphone in any one of the foregoing implementations. The body is connected to the earphone through wireless communication. When the foregoing solutions are used, an environment inside the ear canal is connected to an environment outside the ear canal by using the sound guide channel disposed in the housing, so that sound pressure inside the ear canal can be exposed or exhausted to a surrounding environment outside the earphone. This reduces pressure inside the ear canal, thereby improvising sound experience of the user.

DESCRIPTION OF EMBODIMENTS

Figure 1:
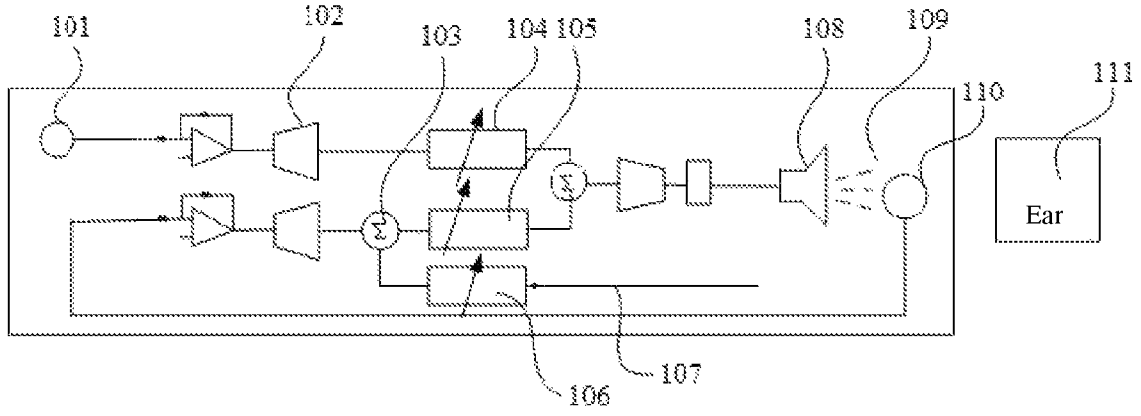
FIG. 1 is a block diagram of a structure of an earphone according to an embodiment of this disclosure.

The following further describes in detail embodiments of this disclosure with reference to the accompanying drawings.

In this disclosure, earphones are usually classified into an earbud and a headphone based on appearances. The earbud is usually an earphone that has a small driver unit diameter and that can be worn on an external auricle or inserted into an ear canal. A largest difference of the headphone from the earbud in appearance is a size. This type of earphone usually has a size far greater than a size of the earbud, and may be classified as a medium-size earphone or a full-size earphone based on a size of an ear cover. In short, an ear cover of the medium-size earphone cannot completely cover an auricle, while the full-size earphone, commonly referred to as a "big earphone", can completely cover an auricle to achieve a better sound insulation effect.

Earbuds are further classified into a semi-in-ear earbud and an in-ear earbud. Usually, an earbud that can be inserted into an external auditory meatus is referred to as the in-ear earbud, and an earbud worn on an external auricle is referred to as the semi-in-ear earbud. The earphone in this disclosure is an earbud.

The earphone provided in embodiments of this disclosure may be different types of earphones. For example, the earphone may include a neck-mounted earphone or a non-neck-mounted earphone based on a wearing manner, or may include a wired earphone, a common Bluetooth wireless earphone, or a TWS (True Wireless Stereo) earphone based on a communication manner. Any type of used earphone is applicable to embodiments of this disclosure. In the following embodiments, the TWS earphone is used as an example for description.

As the TWS earphone is increasingly popular, people have higher requirements for acoustic performance and comfort of the TWS earphone. TWS earphones are also classified into an in-ear earphone and a semi-in-ear earphone. Due to a sealing function of a rubber sleeve, the in-ear earphone usually leaks little sound from an ear canal, so that both a response difference between different users and stability of a SP (Second Path) are relatively good. In terms of acoustic performance, the in-ear earphone is relatively suitable for performing feedback/hybrid noise cancellation.

The semi-in-ear earphone has relatively good acoustic comfort and wearing comfort. Due to different ear shapes and sizes of different users, different amounts of sound may be leaked, resulting in inconsistent acoustic performance between users. Due to instability of an acoustic response, it is difficult to design a filter during feedback noise cancellation designing. In addition, due to instability of leakage, correlation between an SP response and a DRP (Drum Reference Point) response of feedback noise cancellation is poor, and consequently noise cancellation performance at a DRP also becomes unstable. This severely affects noise cancellation experience. In view of this, embodiments of this disclosure provide an earphone for improving a sound effect. The following describes the earphone in detail with reference to specific accompanying drawings and embodiments. It should be understood that the embodiments of this disclosure are applicable to both an in-ear earphone and a semi-in-ear earphone, and in particular, bring a more obvious gain for a scenario of the semi-in-ear earphone.

To facilitate understanding of the earphone provided in embodiments of this disclosure, a basic structure of the earphone provided in embodiments of this disclosure is first described.

FIG. 1 is a block diagram of a structure of an earphone according to an embodiment of this disclosure, and is used to describe components of the earphone provided in this embodiment of this disclosure. The earphone provided in this embodiment of this disclosure includes two forms: feedforward noise cancellation and feedback noise cancellation.

A feedforward noise cancellation manner is as follows: A feedforward microphone (FF Mic for short) 101 is configured to pick up outside environment noise. After the noise passes through an ADC analog-to-digital conversion module 102, a digital signal of the noise is sent to a feedforward controller 104. After the digital signal is processed by the feedforward controller 104, a corresponding control signal is generated. The control signal passes through a digital-to-analog conversion module 107 to drive a speaker 108 to output a sound signal to generate a second path 109. Sound generated by the second path 109 enters an ear 111. In the feedforward noise cancellation manner, the signal is processed by using the feedforward controller 104, and then a sound wave signal of original noise actually transmitted by using a physical path is superimposed on a processed signal (the control signal), to achieve noise cancelation. An advantage of feedforward active noise control is that the microphone receives pure noise and does not receive sound emitted from the speaker. Therefore, a system is an open loop and does not cause any closed-loop oscillation or squealing. Therefore, a circuit can be independently debugged when a feedforward noise cancellation earphone is used, to achieve an optimal noise cancellation effect. However, the noise passes through the speaker and is reflected for multiple times in the speaker, and therefore a size and a phase of the noise have changed. The noise collected by the feedforward microphone 101 is greatly different from noise in the speaker 108. In addition, directivity of outside noise is strong, and therefore it is difficult to use a same circuit to meet noise cancellation requirements of noise from different directions.

In addition to the foregoing feedforward noise cancellation structure, a feedback noise cancellation manner further includes a feedback microphone 110. The feedback microphone 110 does not need to receive outside environment noise in advance, but receives both noise at the feedback microphone 110 and a second path 109 emitted by the speaker 108, and then an error signal is adjusted by using a feedback controller 105, to achieve noise cancellation. 106 is a signal source of an SP response, is a downlink music signal, and is not picked up by using the FF Mic. A signal from a circuit and a processed noise signal picked up by the mic are mixed, and then a mixed signal is output to the speaker for playing. Due to a feedback system, when a gain of an amplifier is increased to a specific degree, the system becomes unstable, resulting in high-frequency squealing or low-frequency oscillation. To maintain stability of a control system, the second path 109 needs to be as stable as possible, that is, an SP response of the FF Mic needs to be stable, and large fluctuation cannot occur due to leakage. In addition, because a point that really needs noise cancellation is a DRP, the SP response of the FF Mic needs be linearly correlated with a response at the DRP. Only in this way, an algorithm can be well adapted.

Figure 2:
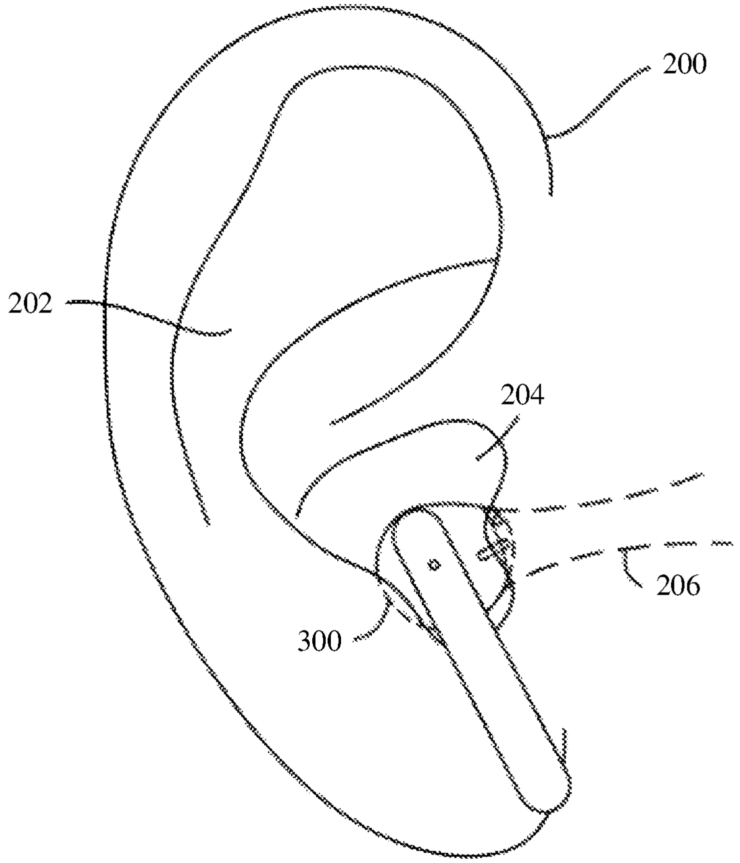
FIG. 2 is a schematic diagram of an application scenario of an earphone according to an embodiment of this disclosure.

FIG. 2 is a schematic diagram of an application scenario of an earphone according to an embodiment of this disclosure. A dashed line represents a blocked structure. An ear 200 of a user includes an auricle 202, an auricular concha 204, and an ear canal 206. The auricle 202 is a fleshy part that is of an external ear and that protrudes from a side surface of a head, and the auricular concha 204 guides the auricle 202 to a curved cavity part of the ear canal 206. When the earphone provided in this embodiment of this disclosure is worn, the earphone stays in the auricular concha 204 of the ear 200 and extends into the curved cavity part of the ear canal 206.

Figure 3:
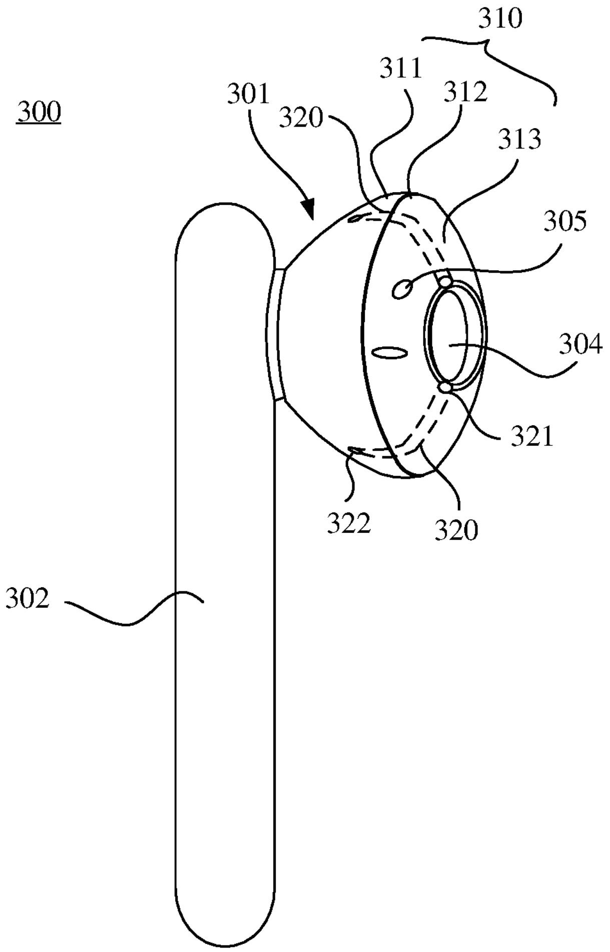
FIG. 3 is a schematic diagram of a structure of an earphone according to an embodiment of this disclosure.

FIG. 3 is a schematic diagram of a structure of an earphone 300. Based on functions, the earphone 300 provided in this embodiment of this disclosure may be divided into a main body structure 301 configured to be inserted into an ear canal, and a tube structure 302 connected to the main body structure 301. The main body structure 301 is configured to carry most structures of the earphone 300, for example, different components such as a speaker, a driver, and an FF Mic. The tube structure 302 extends from the main body structure 301, and may be integrated with the main body structure 301. As an optional solution, a size of the tube structure 302 may be designed to include a cable. The cable may include a wire extending from a power sound source (not shown) to the speaker assembly. The wire may carry an audio signal obtained after the driver performs audio conversion.

Embodiment 1

Based on the foregoing embodiments, Embodiment 1 of this disclosure discloses an earphone 300, including a housing 310. The housing 310 is configured to carry components, cables, and the like of the earphone 300. For example, the components may include a speaker assembly. The housing 310 includes a front cavity and a rear cavity that are separated by the speaker assembly. The front cavity is located on a side that is of the speaker assembly and that is a sound output direction, and the rear cavity is located on an opposite side of the sound output direction of the speaker assembly. A structure of the speaker assembly and the front cavity and the rear cavity that are obtained through division by using the speaker assembly are conventional settings of the earphone 300. Details are not described herein.

For an outer surface of the housing 310, the housing 310 has a clamping region 312 configured to be clamped in an ear canal of a user. It should be understood that, although the clamping region 312 in FIG. 3 is represented by a line, the clamping region 312 has a specific width, to ensure full contact with the ear canal during wearing. The housing 310 is divided into a main body region 311 and a tip region 313 by the clamping region 312, and the main body region 311 and the tip region 313 are arranged on two sides of the clamping region 312. During wearing, the main body region 311 is exposed from the ear canal, and the tip region 313 is located inside the ear canal. As an optional solution, the tip region 313 uses a structure tapered in a direction away from the main body region 311, and a shape of the tip region 313 can allow the tip region 313 to be inserted into the ear canal.

A main sound output hole 304 is disposed in the housing 310, and the main sound output hole 304 may be formed in the tip region 313. When the tip region 313 is positioned inside the ear canal, the main sound output hole 304 is located inside the ear canal, and the main sound output hole 304 is connected to the front cavity of the housing 310, and can output sound generated by the speaker assembly (in response to an audio signal) to the ear canal.

As an optional solution, the main sound output hole 304 may have any size and dimension suitable for implementing expected acoustic performance of the earphone 300. For example, the main sound output hole 304 may be of different shapes such as oval or round.

When the earphone 300 is worn in the ear canal, the clamping region 312 may be in close contact with the ear canal. However, because the housing 310 is usually made of a non-flexible or rigid material (such as plastic), close contact between the clamping region 312 and the ear canal may not be airtight. A gap may be caused between the clamping region 312 and the ear canal, and the gap may be used for air leakage. Because different users have different ear canals, different gaps are caused between the clamping region 312 and the ear canals. In addition, for a same user, each time the same user wears the earphone 300, an airflow leakage amount may be different due to different strength or a different position during wearing. Therefore, airflow leakage between the clamping region 312 and the ear canal is uncontrollable, and is affected by many artificial factors. However, a difference in airflow leakage amount may cause a bad feeling for the user. For example, when the speaker assembly in the earphone 300 sends sound to the ear canal, a high sound pressure level at a low frequency may appear inside the ear canal, and the high sound pressure may cause an unpleasant sound effect for the user. In addition, because the tip region 313 of the housing 310 extends into the ear canal, a large amount of air is prevented from leaking around the tip region 313, and consequently the caused high sound pressure cannot be rapidly released.

In view of this, referring to FIG. 3, one or more sound guide channels 320 are disposed in the earphone 300 provided in this embodiment of this disclosure, each sound guide channel 320 is disposed in a sidewall of the housing 310, and each sound guide channel 320 is configured to: when the earphone 300 is normally worn, connect air inside the ear canal of the user to air outside the ear canal without connecting air in the front cavity to air in the rear cavity. It should be understood that the foregoing normal wearing is a wearing manner in which the earphone can be normally used, for example, a wearing manner indicated in an existing earphone specification.

FIG. 3 illustrates two sound guide channels 320. However, it should be understood that the one or more sound guide channels 320 provided in this embodiment of this disclosure may be one sound guide channel 320, or may be two or more sound guide channels 320. All sound guide channels may be disposed in a same manner or different manners. For implementations of various sound guide channels, refer to the following descriptions.

In an embodiment, at least one of the one or more sound guide channels 320 is a through hole disposed in the housing 310. The through hole is located in the sidewall of the housing 310 and extends in the sidewall of the housing 310. Two ends of the through hole are respectively a first opening 321 and a second opening 322. The first opening 321 and the second opening 322 are located on the outer surface of the housing 310 (for example, are respectively arranged on two sides of the clamping region 312), and are configured to be respectively connected to air inside the ear canal and air outside the ear canal, so that air inside the ear canal is connected to air outside the ear canal by using the through hole in the sidewall. The outer surface of the housing 310 is a surface that is of the housing 310 and that faces the ear canal.

For ease of description, the following uses one sound guide channel 320 as an example for description in this embodiment. Referring to FIG. 3, a lower sound guide channel in the figure is used as an example. When the earphone 300 is worn in the ear canal of the user, a first opening 321 of the sound guide channel 320 is located inside the ear canal, and a second opening 322 is located outside the ear canal. The first opening 321 is connected to air inside the ear canal when the earphone 300 is normally worn, and the second opening 322 is connected to air outside the ear canal when the earphone 300 is normally worn, so that the sound guide channel 320 directly connects the inside of the ear canal to the outside of the ear canal of the user.

Figure 4:
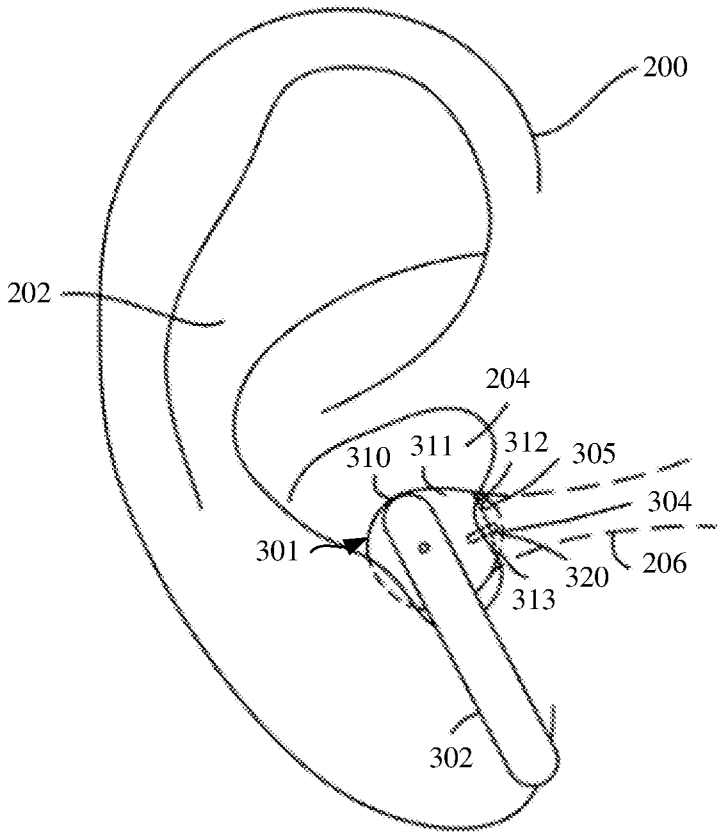
FIG. 4 is a reference diagram of a use status of an earphone according to an embodiment of this disclosure.

FIG. 4 shows a schematic diagram of an earphone during application. When the earphone is worn on an ear 200 of the user, the sound guide channel 320 may extend from the tip region 313 to outside air across the clamping region 312. The first opening and the second opening are respectively located inside the ear canal 206 and outside the ear canal 206, and the ear canal 206 of the user is connected to outside air by using the sound guide channel 320. The sound guide channel 320 may implement functions of exhausting air from the ear canal 206 and outputting sound from the earphone to an outside environment of the earphone.

It may be understood that in the foregoing solution of this disclosure, the through hole in the housing is equivalent to a "tunnel" located in the housing, and air inside the ear canal of the user is connected to air outside the ear canal by using the "tunnel".

As an optional solution, the first opening 321 and the second opening 322 are respectively disposed on the tip region 313 and the main body region 311. When the earphone 300 is worn in the ear canal of the user, the first opening 321 is located inside the ear canal, and the first opening 321 is not blocked by the ear canal; and the second opening 322 is located outside the ear canal, and the second opening 322 is not shielded by an auricle or an auricular concha of the ear As an optional solution, the sound guide channel 320 may be divided into two parts: a first channel and a second channel, and the first channel is connected to the second channel. The second channel is disposed in the main body region 311, and the first channel is disposed in the tip region 313. When the earphone (for example, a semi-in-ear earphone) does not include an elastic sleeve, the first channel is disposed in a housing part located in the tip region 313. When the earphone (for example, an in-ear earphone) includes an elastic sleeve, the elastic sleeve is disposed in the tip region 313. A part of at least one of the one or more sound guide channels is disposed in the elastic sleeve. For example, when the sound guide channel 320 is divided into the first channel and the second channel, the first channel may be located in the elastic sleeve, so that the first opening 321 on the first channel can be directly connected to space inside the ear canal.

As an optional solution, when the sound guide channel 320 is disposed, the first opening 321 and the second opening 322 of the sound guide channel 320 may use different area ratios. For example, an opening area S1 of the first opening 321 and an opening area S2 of the second opening 322 meet: a ratio of S1 to S2 is 0.5 to 2. Specifically, the opening area S1 of the first opening 321 may be equal to the opening area S2 of the second opening 322, or the opening area S1 of the first opening 321 may be greater than or less than the opening area S2 of the second opening 322. For example, the opening area S1 of the first opening 321 is any proportion between 0.5 to 2, such as 0.5 times, 0.8 times, 1.1 times, 1.2 times, 1.3 times, 1.4 times, 1.5 times, or 2 times, of the opening area S2 of the second opening 322. When the above proportion is used, air inside the ear canal can smoothly flow to the outside of the ear canal.

In addition, to ensure an enough air leakage amount, when the first opening 321 is disposed, the opening area S1 of the first opening 321 of the sound guide channel 320 is not less than 2 $mm^2$. For example, the opening area S1 of the first opening 321 may be different areas such as 2 $mm^2$, 2.5 $mm^2$, 3 $mm^2$, 3.5 $mm^2$, or 4 $mm^2$, to ensure that the sound guide channel 320 has a stable leakage amount.

As an optional solution, both the first opening 321 and the second opening 322 of the sound guide channel 320 illustrated in FIG. 3 are oval. However, it should be understood that the port shape illustrated in FIG. 3 is only one specific example, and the first opening 321 and the second opening 322 may be alternatively of other shapes. For example, the first opening 321 and the second opening 322 may be of different shapes, such as round, oval, square, or special-shaped. In addition, the first opening 321 and the second opening 322 may be of a same shape or different shapes. For example, both the first opening 321 and the second opening 322 may be round; or the first opening 321 may be round, and the second opening 322 may be oval.

As an optional solution, a direction of the sound guide channel 320 may be disposed in different manners, for example, different shapes such as linear, curved, serpentine, or branch-shaped. However, it should be understood that, regardless of a direction form of the sound guide channel 320, the sound guide channel 320 can facilitate air circulation and does not hinder air. When the sound guide channel 320 includes the first channel and the second channel, the first channel and the second channel each may be of different shapes such as linear, curved, serpentine, or branch-shaped, provided that it is ensured that the first channel is connected to the second channel.

To facilitate air circulation, optionally, a length direction of the sound guide channel 320 may be partially parallel to an ear canal direction of the user, to facilitate leakage of air inside the ear canal. For example, the length direction of the sound guide channel 320 is parallel to the ear canal, and the direction of the sound guide channel 320 may vary with the ear canal. In addition, a cross-section of the sound guide channel 320 may be of different shapes, such as oval, trapezoidal, round, square, or special-shaped. As an optional solution, the sound guide channel 320 may be a sound guide channel 320 with a constant cross-sectional area, or may be a sound guide channel 320 with a gradient cross-sectional area. For example, when a cross-sectional area or shape of the first opening 321 is different from a cross-sectional area or shape of the second opening 322, a cross-sectional area or shape of the sound guide channel 320 may adaptively change, to ensure smooth changing from the shape or area of the first opening 321 to the shape or area of the second opening 322 in the sound guide channel 320.

As an optional solution, when the sound guide channel 320 is disposed, a length of the sound guide channel 320 is not less than 3 mm. The length of the sound guide channel 320 indicates a linear distance between the first opening 321 and the second opening 322. That is, in this embodiment of this disclosure, there should be a distance of a specific length between the first opening 321 and the second opening 322 of the sound guide channel 320, to ensure that when the clamping region 312 is in contact with the ear canal, the ear canal does not block the first opening 321, and the second opening 322 can be exposed to an outside environment and is not shielded by another structure of the ear, thereby ensuring smoothness of the sound guide channel 320. For example, the distance between the first opening 321 and the second opening 322 may be different distances such as 3 mm, 3.5 mm, 4 mm, 4.5 mm, or 5 mm.

As an optional solution, protective meshes may be disposed for the first opening 321 and the second opening 322. The protective mesh is a porous structure, so that an outside impurity can be prevented from entering the sound guide channel 320, thereby ensuring reliability of the sound guide channel 320.

As an optional solution, the first opening 321 may be disposed on the surface that is of the housing 310 and that faces the ear canal, to conveniently connect the inside of the ear canal to the outside of the ear canal, so that air inside the ear canal can enter the sound guide channel 320 by using the first opening 321. It should be understood that, that the first opening 321 is disposed on the surface that is of the housing 310 and that faces the ear canal is only one specific example of a disposition position of the first opening 321. The first opening 321 provided in this embodiment of this disclosure only needs to be disposed at a position that is not shielded by the ear canal. For example, the first opening 321 may be disposed at a position connected to the main sound output hole 304, so that an airflow output from the main sound output hole 304 can directly enter the sound guide channel 320 by using the first opening 321, thereby improving an air leakage effect. The first opening 321 is connected to the main sound output hole 304, so that the ear canal is also prevented from blocking the first opening 321, thereby ensuring airflow leakage stability of the sound guide channel 320. Alternatively, an opening direction of the first opening 321 may be the same as an opening direction of the main sound output hole 304, so that the ear canal can also be prevented from blocking the first opening 321.

As an optional solution, when the opening direction of the first opening 321 is the same as the opening direction of the main sound output hole 304, the first opening 321 is formed in a sidewall (the sidewall of the housing 310) around the main sound output hole.

In this embodiment of this disclosure, when the sound guide channel 320 is disposed, a stable airflow exhaust channel can be formed without impact caused by cooperation between the clamping region 312 and a sidewall of the ear canal 206. Therefore, the sound guide channel 320 can be used as a controlled sound guide port. A size and a shape of the sound guide channel 320 may be selected to achieve an acoustically satisfactory effect. In addition, the sound guide channel 320 can be used as a controlled sound guide port, so that consistent effects can be maintained at all times a same user wears the earphone, and always consistent air leakage amounts can also be implemented between different users. Therefore, sound pressure in the earphone can be exposed to an outside surrounding environment, so that a second path emitted by the speaker has a stable characteristic, to conveniently calibrate the earphone to modify an acoustic response of the earphone, and improve SP response consistency, thereby improving overall listening performance and noise cancellation performance of the earphone.

Embodiment 2

Figure 5:
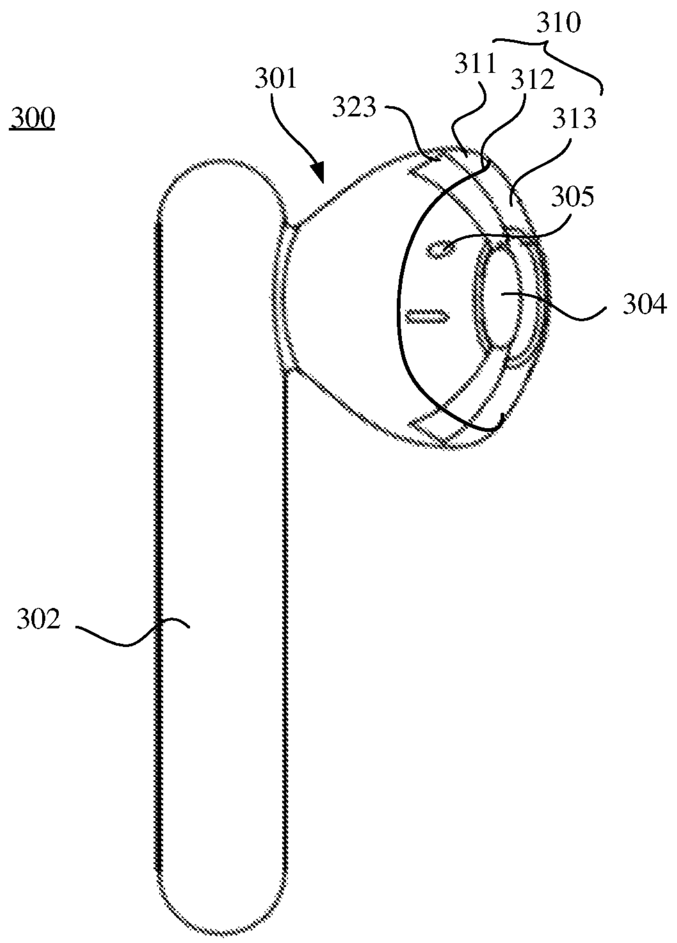
FIG. 5 is a schematic diagram of a structure of another earphone according to an embodiment of this disclosure.

Based on the foregoing embodiments, this embodiment describes another implementation of the sound guide channel. FIG. 5 is a schematic diagram of a structure of another earphone according to an embodiment of this disclosure. For some reference numerals in FIG. 5, refer to same reference numerals in FIG. 3. A sound guide channel of the earphone shown in FIG. 5 is a groove 323, that is, at least one of one or more sound guide channels is a groove 323 disposed on an outer surface of a housing 310. An opening at one end of the groove 323 is connected to air inside an ear canal when the earphone 300 is normally worn, and an opening at the other end of the groove 323 is connected to air outside the ear canal when the earphone 300 is normally worn. During specific disposition, the groove 323 is disposed on the outer surface (a surface that is of the housing 310 and that faces the ear canal) of the housing 310, and extends from a tip region 313 of the housing 310 to a main body region 311.

As an optional solution, the groove 323 may use a linear groove. It should be understood that a shape of the groove 323 provided in this embodiment of this disclosure is not limited to the linear groove 323 shown in FIG. 5. Different shapes of grooves such as a curved groove or a groove of a water drop shape may be alternatively used.

When the groove 323 is used as the sound guide channel, the groove 323 may be connected to a longer side of a main sound output hole 304, so that the groove 323 can be prevented from being shielded by the ear canal, thereby ensuring air leakage stability.

When the groove 323 shown in FIG. 5 is used as the sound guide channel, connection between a sound guide channel inside the ear canal and a sound guide channel outside the ear canal can also be implemented, to achieve a stable improvement effect for a sound effect of the earphone. In addition, linear correlation between an SP response and a DRP response is involved, to obtain a relatively large gain. In addition, when the groove 323 is used, an opening area of the sound guide channel is increased, and the sound guide channel is prevented from being shielded by the ear canal. It should be understood that when the groove 323 is used as the sound guide channel, a depth or the shape of the groove 323 should ensure that when the earphone is worn in an ear, the groove 323 is not blocked by a part that is of the ear and that is pushed into the groove 323.

Embodiment 3

Figure 6:
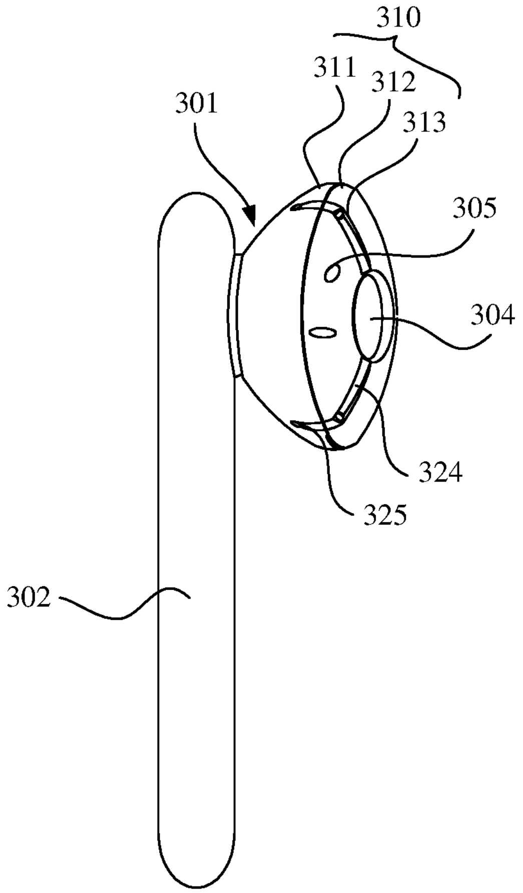
FIG. 6 is a schematic diagram of a structure of another earphone according to an embodiment of this disclosure.

Based on the foregoing embodiments, this embodiment describes another implementation of the sound guide channel. FIG. 6 is a schematic diagram of a structure of an earphone according to an embodiment of this disclosure. For some reference numerals in FIG. 6, refer to the same reference numerals in FIG. 3. A sound guide channel shown in FIG. 6 is in a combination form of a groove 324 and a through hole 325. The through hole 325 is connected to the groove 324 to form the sound guide channel. In this case, at least one of one or more sound guide channels includes a first channel group and a second channel group. The first channel group includes at least one first channel, such as one, two, or three first channels. The first channel is a groove 324 disposed on an outer surface of a housing. The second channel group includes at least one second channel, such as one, two, or three second channels. The second channel is a through hole 325 disposed in a sidewall of the housing. The first channel group is connected to the second channel group, that is, the groove 324 is connected to the through hole 325. An opening at one end of a combined channel including the first channel group and the second channel group is connected to air inside an ear canal when the earphone is normally worn, and an opening at the other end of the combined channel is connected to air outside the ear canal when the earphone is normally worn.

As an optional solution, the groove 324 is located in a tip region 313 of the housing 310, and the through hole 325 is located in a main body region of the housing 310. An opening at one end of the through hole 325 is located in a sidewall of the groove 324, so that the groove 324 and the through hole 325 form the sound guide channel. When the combination manner shown in FIG. 6 is used, connection between a sound guide channel inside the ear canal and a sound guide channel outside the ear canal can also be implemented, to achieve a stable improvement effect for a sound effect of the earphone. In addition, linear correlation between an SP response and a DRP response is involved, to obtain a relatively large gain. In addition, when the groove 324 is used in the tip region 313, an opening area of a first opening is increased, so that it can be ensured that a relatively large opening is connected to the inside of the ear canal even when the earphone is in contact with the ear canal.

Embodiment 4

Figure 7:
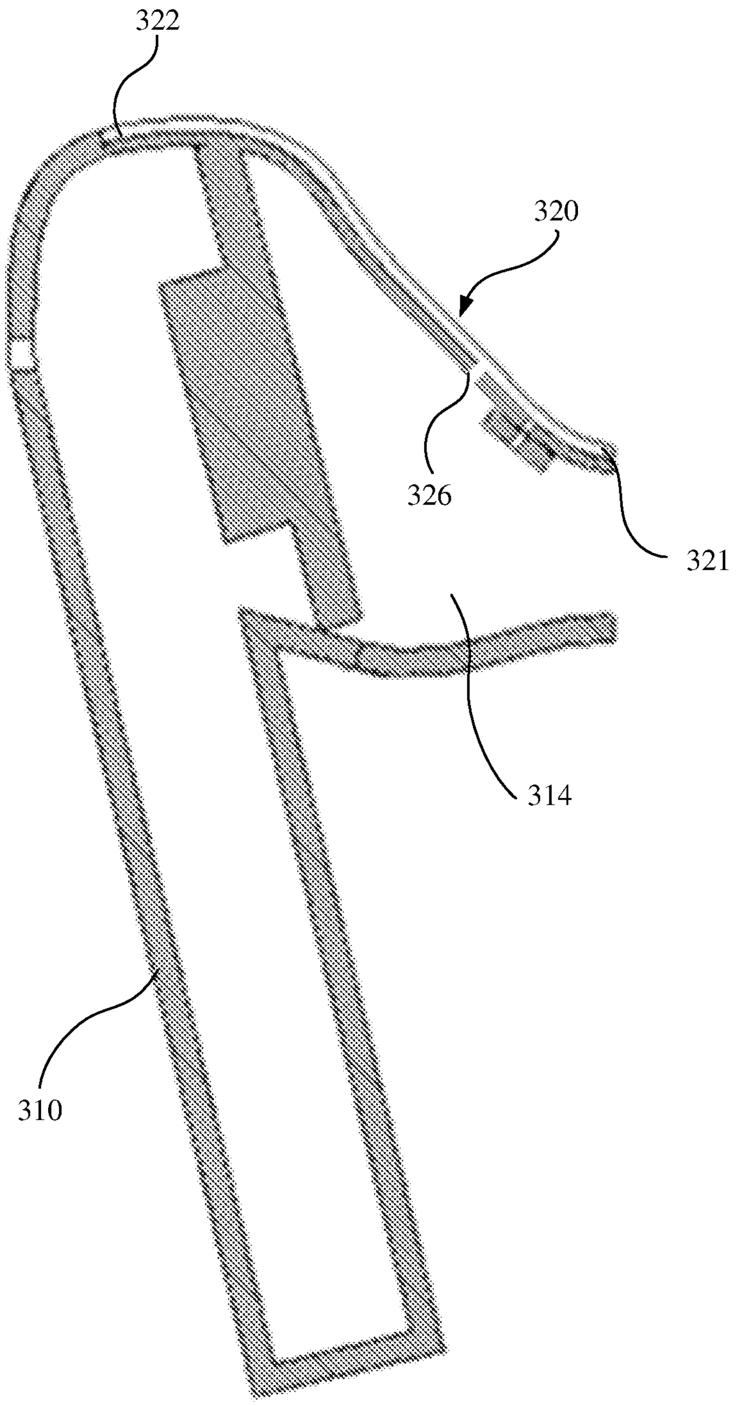
FIG. 7 is a schematic diagram of a structure of another earphone according to an embodiment of this disclosure.

Based on the foregoing embodiments, this embodiment describes another implementation of the sound guide channel. FIG. 7 is a schematic diagram of a structure of an earphone according to an embodiment of this disclosure. For some reference numerals of the earphone shown in FIG. 7, refer to the same reference numerals in FIG. 3. A sound guide channel of the earphone shown in FIG. 7 is a through hole, and the through hole includes three ports: a first opening 321, a second opening 322, and a third opening 326. The first opening 321, the second opening 322, and the third opening 326 are connected to each other. The second opening 322 is located in a main body region, and the second opening 322 is located outside an ear canal of a user when the earphone is worn to the user. The first opening 321 and the third opening 326 are located in a tip region, and the first opening 321 and the third opening 326 may be separately located at different positions. When the earphone is worn to the user, both the first opening 321 and the third opening 326 are located inside the ear canal. When the foregoing structure is used, a stable air channel port may be added by using the added third opening 326, so that when the first opening 321 is shielded, stable air leakage can be ensured by using the third opening 326.

When the sound guide channel has the first opening 321, the second opening 322, and the third opening 326, the sound guide channel may be branch-shaped. For example, the sound guide channel may include a first channel, a second channel, and a third channel. The first opening 321 is located in the first channel, the second opening 322 is located in the second channel, and the third opening 326 is located in the third channel. The first opening 321, the second opening 322, and the third opening 326 are connected through connection between the first channel, the second channel, and the third channel.

As an optional solution, the third opening 326 is connected to a front cavity 314 of a housing 310. When the third opening 326 is connected to the front cavity 314, sound generated by a speaker assembly can directly flow to the second opening 322 by using the third opening 326, to implement air leakage. In addition, when the third opening 326 is disposed in the front cavity 314, the third opening 326 can be prevented from being shielded by the ear canal, thereby ensuring that the sound guide channel can have a stable leakage amount.

Embodiment 5

Figure 8:
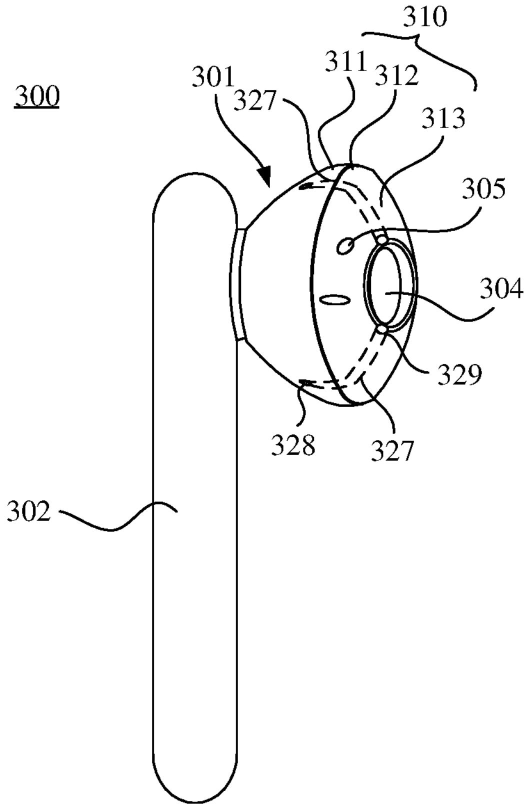
FIG. 8 is a schematic diagram of a structure of another earphone according to an embodiment of this disclosure.

Based on the foregoing embodiments, this embodiment describes another implementation of the sound guide channel. Referring to a conduit 327 shown in FIG. 8, at least one of one or more sound guide channels may be a conduit 327 disposed in a sidewall of a housing 310. For a quantity of conduits 327, refer to the descriptions of the other types of sound guide channels in the foregoing embodiments. Details are not described herein.

The conduit 327 has a first opening 329 and a second opening 328. The first opening 329 is connected to air inside an ear canal when the earphone is normally worn, and the second opening 328 is connected to air outside the ear canal when the earphone is normally worn. The conduit 327 may be understood as an alternative structure of the through hole in Embodiment 1. For a shape and a parameter of the conduit 327, refer to those of the through hole in Embodiment 1. Details are not described herein.

It should be understood that, when the conduit 327 is specifically disposed, the conduit 327 may be partially buried in the housing 310 and partially exposed from the housing 310, or may be completely buried in the housing 310. This is not specifically limited herein.

As an optional solution, the conduit 327 may be a conduit 327 made of a soft material or a conduit 327 made of a hard material. For example, the conduit 327 may use a material such as plastic or silicone, or the conduit 327 may use a material consistent with a material of the housing 310.

Embodiment 6

A sound pickup channel is described based on the earphones illustrated in the foregoing embodiments.

When an earphone is being calibrated, sound of a second path is received as a reference value by using a feedback microphone. The parameter is collected by using the feedback microphone. A specific structure includes: a microphone (feedback microphone) disposed in a front cavity and a sound pickup channel connected to the microphone. When the earphone is normally worn, air inside an ear canal of a user is connected to the microphone without connection to air in the front cavity. An end of the sound pickup channel is connected to the microphone, the other end of the sound pickup channel includes a sound pickup hole 305, and the sound pickup hole 305 is disposed on a surface that is of a housing 310 and that faces the ear canal.

In an in-ear earphone, the sound pickup hole 305 usually needs to be as close to a speaker assembly as possible, to obtain a direct SP response. For the in-ear earphone, because the in-ear earphone is sealed with a rubber sleeve, a front cavity is not prone to air leakage, and correlation between an SP response and a DRP response is usually good. However, for a semi-in-ear earphone provided in this embodiment of this disclosure, due to air leakage of the earphone, linear correlation between an SP response in front of a speaker and a response at a DRP becomes poor. In view of this, in the earphone provided in this embodiment of this disclosure, the sound pickup hole 305 is disposed on a first side of a clamping region 312 on the housing. The first side is a side close to the inside of the ear canal 206 relative to the clamping region 312 on the housing. The sound pickup hole 305 picks up an SP response obtained after leakage, and an SP response at a DRP is also a response obtained after leakage, so that a better SP response and a better DRP response can be obtained.

The sound pickup hole 305 may be disposed at different positions when being disposed. For example, the sound pickup hole 305 may be disposed on an outer surface that is of the housing 310 and that faces the ear canal. As shown in FIG. 3, the sound pickup hole 305 is disposed in a tip region 313 of the housing 310. When the earphone is worn to the user, the sound pickup hole 305 should not be shielded by the ear canal. The sound pickup hole 305 may be located in different structures when being located in the tip region 313 of the housing 310. For example, the sound pickup hole 305 may be located on an outer surface of the tip region 313, the sound pickup hole 305 may be located in a sound guide channel, or the sound pickup hole 305 is located in a main sound output hole 304. In addition, in a manner in which the sound pickup hole 305 is changed to face the outside of the housing 310, linear correlation between an SP response and a DRP response can be improved, and a binaural recording effect can also be improved.

When the feedback microphone is located in the housing 310, the feedback microphone may be placed at the tip region 313 or another position of the earphone. For example, the feedback microphone is disposed on an inner surface of the housing 310, to facilitate disposition of the feedback microphone and also facilitate data collection. When cooperating with the sound pickup hole 305, a sound pickup surface of the feedback microphone faces the sound pickup hole 305, and may receive sound received by the sound pickup hole 305. The sound pickup hole 305 may be connected to the microphone in different manners. For example, the sound pickup hole 305 may be connected to the feedback microphone by using the foregoing sound pickup channel, or may be connected to the feedback microphone by using another tubular structure, thereby improving a pickup sound effect of the feedback microphone. When the sound pickup hole 305 of the earphone is placed at the tip region 313 of the earphone and the sound pickup surface of the feedback microphone faces the outside of the housing 310, correlation between an SP response and a DRP response can be greatly improved, thereby reducing a noise level at a DRP.

To facilitate understanding of linear correlation between an SP response and a DRP response of the earphone provided in this embodiment of this disclosure, the following provides simulation descriptions for a conventional earphone and the earphone provided in this embodiment of this disclosure.

Figure 9:
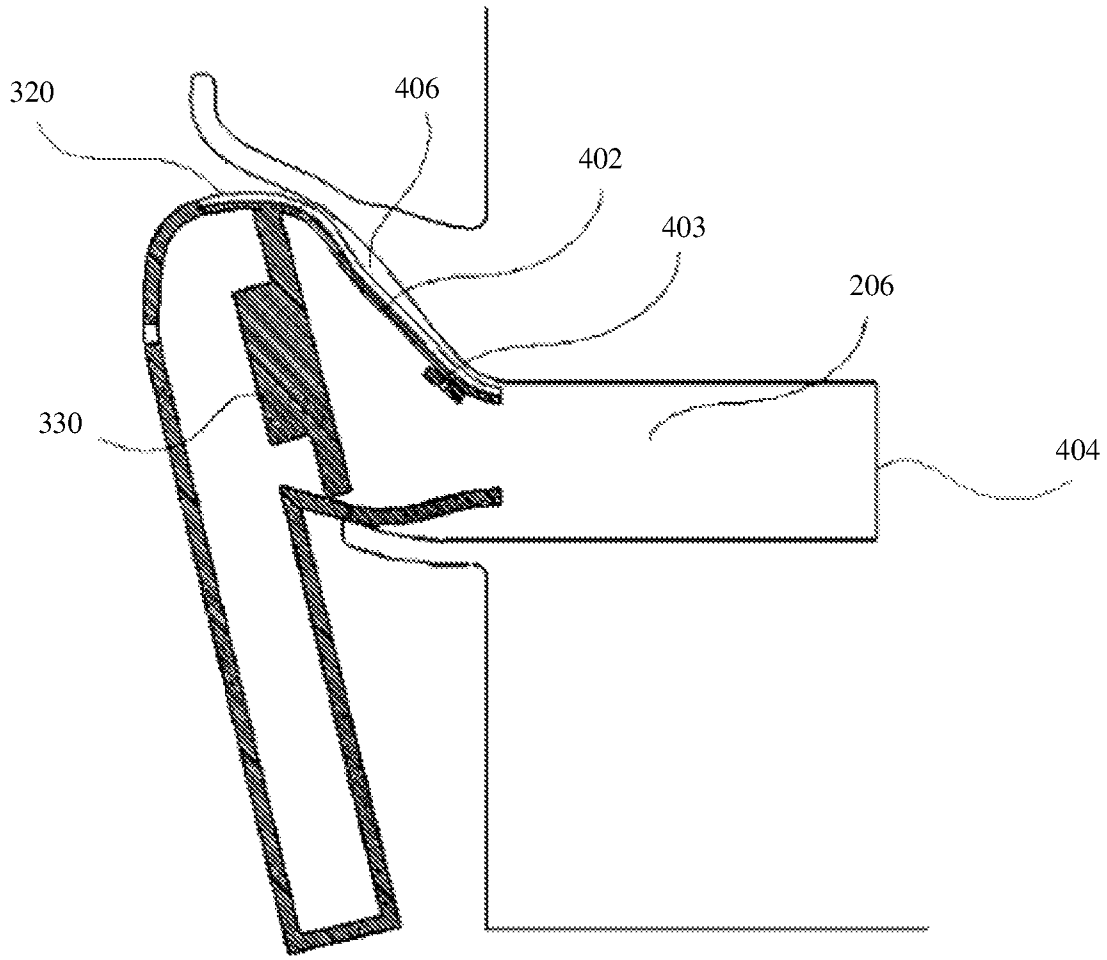
FIG. 9 is a schematic diagram of a structure of an earphone for emulation according to an embodiment of this disclosure.

FIG. 9 is a schematic diagram of placement of an earphone in an ear canal according to an embodiment of this disclosure. A speaker assembly is located in a housing, sound emitted by the speaker assembly is provided for an ear canal 206 by using a front cavity and a main sound output hole of a tip region, and sound is received by an eardrum. A part of the sound is further leaked to outside air by using a gap 406 between the earphone and the ear canal 206. This part of leakage is greatly correlated with wearing. A sound guide channel 320 achieves a fixed leakage amount, and is not affected by a degree of wearing looseness. This disclosure does not show a structure of the conventional earphone. The conventional earphone for comparison may be considered as a structure in which the sound guide channel 320 is removed from the earphone shown in FIG. 9. The following provides descriptions by marking, in the earphone shown in FIG. 9, detection positions of the conventional earphone and the earphone provided in this embodiment of this disclosure.

In FIG. 9, a first position 402 is an SP response position of the conventional earphone (having no sound guide channel), a second position 403 is an SP response position of the earphone in the solutions of this disclosure, and a third position 404 is a DRP response position.

Figure 10:
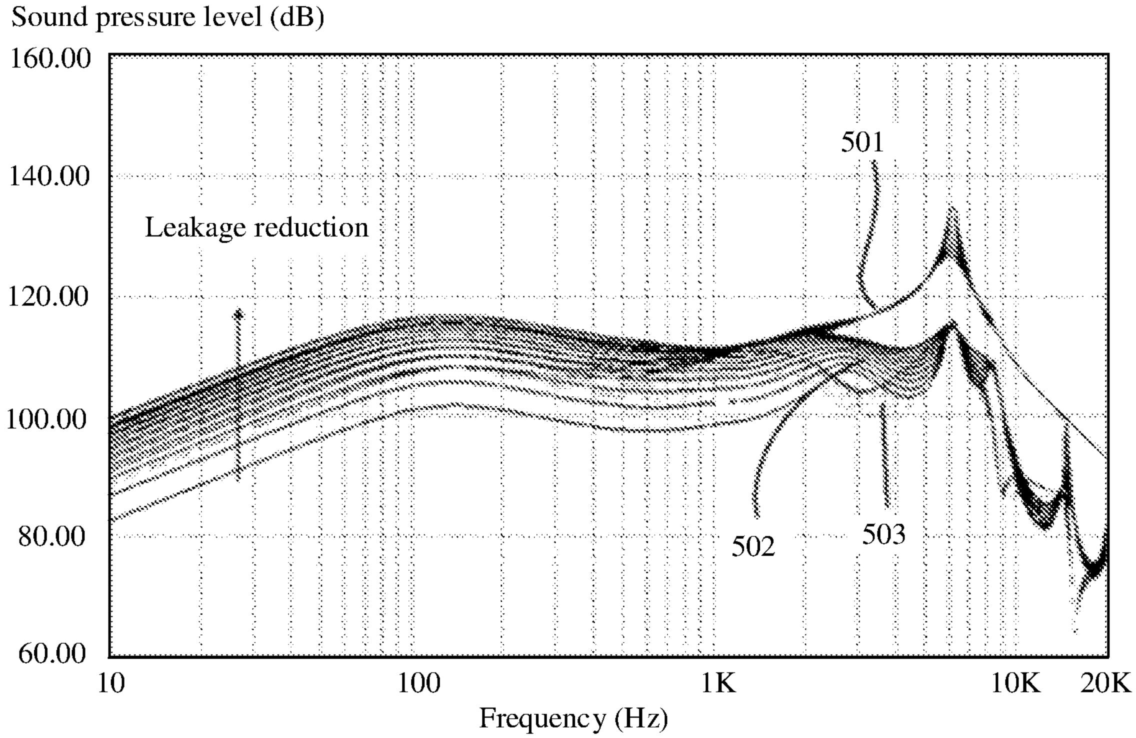
FIG. 10 is a schematic diagram of a frequency response curve of a conventional earphone according to an embodiment of this disclosure.

For the conventional earphone, when the conventional earphone has no sound guide channel, a leakage degree of a gap between the earphone and an ear is different based on a different degree of wearing looseness. With a change of the leakage degree, an SP position response of the first position 402, a DRP position response of the third position 404, and an SP position response of the second position 403 are separately observed, to obtain three groups of frequency response curves shown in FIG. 10: a first frequency response curve 501, a second frequency response curve 502, and a third frequency response curve 503. In FIG. 10, a vertical coordinate is a sound pressure level (unit: dB), a horizontal coordinate is a frequency (unit: Hz), and the three frequency response curves are frequency response curves of the conventional earphone at the three positions. It can be appreciated from FIG. 10 that, when there is no sound guide channel, all the three frequency response curves have extremely large deviation from linearity, and there is no linear correlation between the three frequency response curves.

Figure 11:
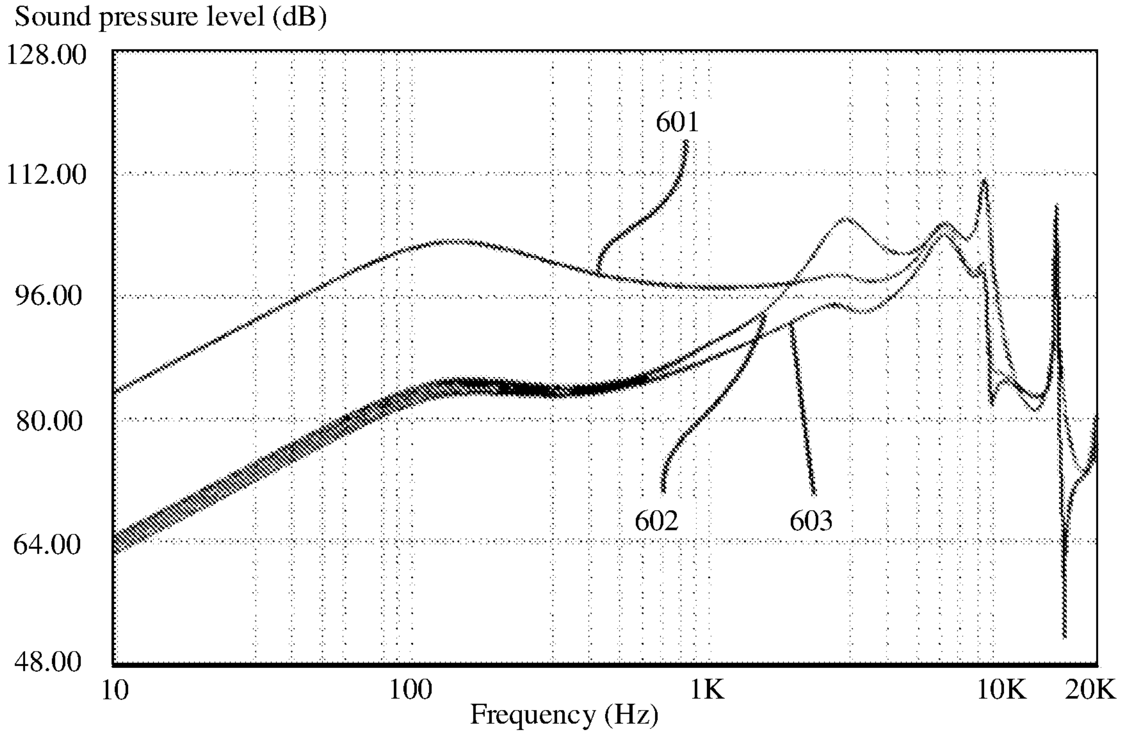
FIG. 11 is a schematic diagram of a frequency response curve of an earphone according to an embodiment of this disclosure.

After the sound guide channel is added, frequency response curves of the three positions are observed gain to obtain a result shown in FIG. 11. In FIG. 11, a vertical coordinate is a sound pressure level (unit: dB), and a horizontal coordinate is a frequency (unit: Hz). It can be appreciated from FIG. 11 that a fourth frequency response curve 601 obtained based on a first position response is greatly improved in consistency, but is not correlated with a fifth frequency response curve 602 obtained based on a third position response; and a sixth frequency response curve 603 obtained based on a second position response and the fifth frequency response curve 602 are completely linearly correlated, and almost overlap in a low frequency part.

In addition, it can be appreciated, through comparison between the fifth frequency response curve 602 and the second frequency response curve 502 and comparison between the third frequency response curve 503 and the sixth frequency response curve 603, that, in the earphone provided in this embodiment of this disclosure, impact caused on low-frequency SP and DRP responses by a wearing manner change is greatly reduced, that is, an SP response multiplicative disturbance caused by leakage is greatly reduced. In addition, frequency response stability during music playing of the earphone is improved, and sound quality experience of the earphone is improved. In addition, the SP position provided in this embodiment of this disclosure improves linear correlation between an SP response and a DRP response, and supports ANC (Active Noise Cancellation) performance, especially, improves ANC performance at an actual experience point DRP.

It can be appreciated, through comparison between the foregoing curves in FIG. 10 and FIG. 11, that, in the earphone provided in this embodiment of this disclosure, a sound guide channel inside the ear canal can be directly connected to a sound guide channel outside the ear canal by using the sound guide channel, to achieve a stable improvement effect for a sound effect of the earphone. In addition, linear correlation between an SP response and a DRP response is involved, to obtain a relatively large gain.

An embodiment of this disclosure further provides a mobile terminal. The mobile terminal may be a common communicable mobile terminal such as a notebook computer, a tablet computer, a mobile phone, or an intelligent wearable device. The mobile terminal includes a body and any one of the foregoing earphones. The body and the earphone may be connected through wireless communication, for example, by using Bluetooth. When the earphone uses the foregoing structure, an environment inside the ear canal may be connected to an environment outside the ear canal by using the sound guide channel disposed in the housing, so that sound pressure inside the ear canal can be exposed or exhausted to a surrounding environment outside the earphone. This reduces pressure inside the ear canal, thereby improvising sound experience of the user.

It is clearly that a person skilled in the art can make various modifications and variations to this disclosure without departing from the spirit and scope of this disclosure. This disclosure is intended to cover these modifications and variations of this disclosure provided that they fall within the scope of protection defined by the following claims and their equivalent technologies.

What is claimed is:

1. An earphone comprising: a housing and a speaker assembly, wherein the housing internally comprises a front cavity and a rear cavity that are separated by the speaker assembly, wherein the front cavity is located on one side that is of the speaker assembly and that is a sound output direction, and the rear cavity is located on an opposite side of the sound output direction of the speaker assembly; and a sound guide channel is at least partially disposed in a sidewall of the housing with two openings on the outer surface of the housing, and the sound guide channel is configured to: when the earphone is normally worn, connect air inside an ear canal of a user to the air outside the ear canal without connecting the air in the front cavity to the air in the rear cavity.

2. The earphone according to claim 1, wherein the housing comprises a main body region and a tip region, and when the earphone is normally worn, the main body region is exposed from the ear canal, and the tip region is located inside the ear canal, and the two openings on the outer surface of the housing includes a first opening and a second opening; and two ends of the sound guide channel respectively comprise the first opening and the second opening; the first opening is located in the tip region, and the second opening is located in the main body region; and when the earphone is normally worn, the first opening is connected to space inside the ear canal, and the second opening is connected to space outside the ear canal.

3. The earphone according to claim 2, wherein a main sound output hole is also disposed in the housing, the main sound output hole is located in the tip region, and the main sound output hole is connected to the front cavity; and the first opening is connected to the main sound output hole, or the first opening is formed in a sidewall around the main sound output hole.

4. The earphone according to claim 2, wherein the sound guide channel is a through hole structure, and the sound guide channel is disposed in the sidewall of the housing.

5. The earphone according to claim 2, wherein an opening area S1 of the first opening is not less than 2 $mm^2$.

6. The earphone according to claim 2, wherein an opening area S1 of the first opening and an opening area S2 of the second opening meet:

a ratio of S1 to S2 is 0.5 to 2.

7. The earphone according to claim 2, wherein the sound guide channel is a groove structure, and the sound guide channel is disposed on an outer surface of the sidewall of the housing.

8. The earphone according to claim 2, wherein the sound guide channel comprises at least a first channel and a second channel that are connected to each other; and a first end of the first channel is connected to a first end of the second channel, a second end of the first channel has the first opening, and a second end of the second channel has the second opening.

9. The earphone according to claim 8, wherein the first channel is disposed in the sidewall of the housing, the first channel is a first through hole structure, the second channel is disposed on an outer surface of the housing, and the second channel is a second groove structure; or the first channel is disposed on an outer surface of the sidewall of the housing, the first channel is a first groove structure, the second channel is disposed in the sidewall of the housing, and the second channel is a second through hole structure.

10. The earphone according to claim 8, wherein the sound guide channel further comprises a third channel, a first end of the third channel is separately connected to the first end of the first channel and the first end of the second channel, a second end of the third channel has a third opening, the third opening is located in the tip region, and when the earphone is normally worn, the third opening is connected to space inside the ear canal.

11. The earphone according to claim 10, wherein the third channel is disposed in the sidewall of the housing, and the third channel is a through hole structure; or the third channel is disposed on the outer surface of the sidewall of the housing, and the third channel is a groove structure.

12. The earphone according to claim 10, wherein the third opening is connected to the front cavity.

13. The earphone according to claim 10, wherein a main sound output hole is also disposed in the housing; and the third opening is connected to the main sound output hole, or the third opening is formed in a sidewall around the main sound output hole.

14. The earphone according to claim 2, wherein the sound guide channel is a conduit structure.

15. The earphone according to claim 2, wherein an elastic sleeve is disposed in the tip region, and a part of the sound guide channel is disposed in the elastic sleeve.

16. The earphone according to claim 1, wherein a length of the sound guide channel is not less than 3 mm.

17. The earphone according to claim 2, wherein the earphone further comprises a microphone, the microphone is disposed in the front cavity, and a sound pickup surface of the microphone faces the tip region; and a sound pickup channel is disposed in the sidewall of the housing, a first end of the sound pickup channel is connected to the sound pickup surface of the microphone, a second end of the sound pickup channel has a sound pickup hole, the sound pickup hole is located in the tip region, and when the earphone is normally worn, the microphone is connected to space inside the ear canal.

18. The earphone according to claim 17, wherein a main sound output hole is also disposed in the housing; and the sound pickup hole is located on an outer surface of the tip region, the sound pickup hole is connected to the main sound output hole, or the sound pickup hole is located in the sound guide channel.

19. A mobile terminal comprising: a body and an earphone, wherein the body is communicatively connected to the earphone;

the earphone comprises a housing and a speaker assembly;

the housing internally comprises a front cavity and a rear cavity that are separated by the speaker assembly, wherein the front cavity is located on one side that is of the speaker assembly and that is a sound output direction, and the rear cavity is located on an opposite side of the sound output direction of the speaker assembly; and a sound guide channel is at least partially disposed in a sidewall of the housing with two openings on the outer surface of the housing, and the sound guide channel is configured to: when the earphone is normally worn, connect air inside an ear canal of a user to the air outside the ear canal without connecting the air in the front cavity to the air in the rear cavity.

20. An earphone comprising: a housing and a speaker assembly, wherein the housing internally comprises a front cavity and a rear cavity that are separated by the speaker assembly, wherein the front cavity is located on one side that is of the speaker assembly and that is a sound output direction, and the rear cavity is located on an opposite side of the sound output direction of the speaker assembly; and a sound guide channel is at least partially disposed in a sidewall of the housing with two openings on the outer surface of the housing, the two openings on the outer surface of the housing includes a first opening and a second opening, and the sound guide channel is configured to: when the earphone is normally worn, connect air inside an ear canal of a user to the air outside the ear canal without connecting the air in the front cavity to the air in the rear cavity; and wherein an opening area S1 of the first opening is not less than 2 $mm^2$ or the opening area S1 of the first opening and an opening area S2 of the second opening meet: a ratio of S1 to S2 is 0.5 to 2.

* * * * *